Figure 1:
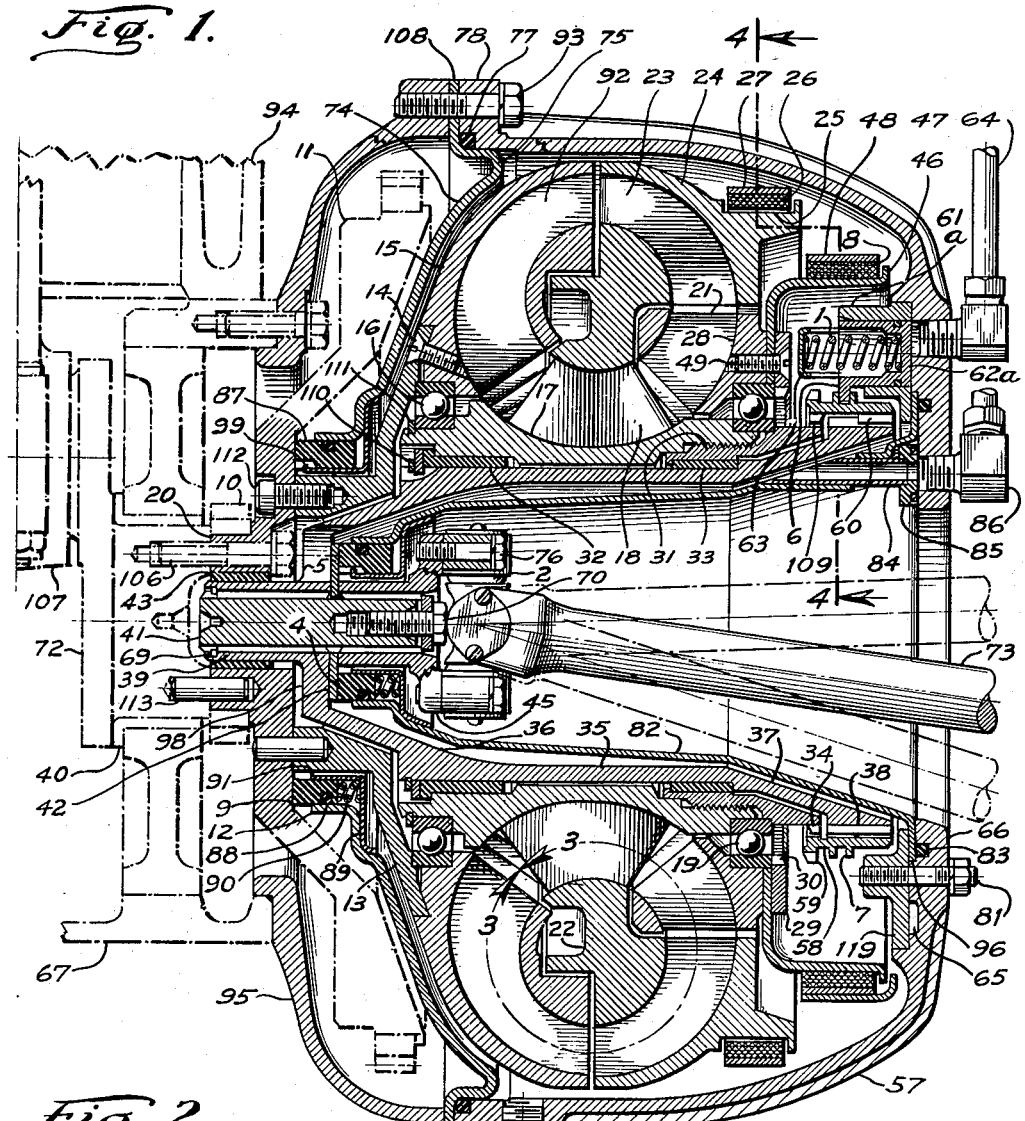

Oct. 21, 1952     J. PAVLECKA     2,614,391
ROTARY HYDRAULIC TORQUE CONVERTER TRANSMISSION

Filed Dec. 1, 1947     2 SHEETS—SHEET 1

INVENTOR:
John Pavlecka

Oct. 21, 1952     J. PAVLECKA     2,614,391
ROTARY HYDRAULIC TORQUE CONVERTER TRANSMISSION
Filed Dec. 1, 1947     2 SHEETS—SHEET 2

INVENTOR:
John Pavlecka

Patented Oct. 21, 1952

2,614,391

UNITED STATES PATENT OFFICE 2,614,391

ROTARY HYDRAULIC TORQUE CONVERTER TRANSMISSION

John Pavlecka, Oak Park, Mich.

Application December 1, 1947, Serial No. 788,996

17 Claims. (Cl. 60—54)

My present invention relates to hydraulic torque converters for transmitting power in both forward and reverse directions without any gears in general, and to a rotary torque converter transmission suitable for installation on an engine in close proximity to a vehicle wheel in particular.

One of the objects of my invention is to devise a hydraulic torque converter transmission wherein the usual universal joint for the wheel drive shaft is placed at a very short distance from the engine so as to provide for maximum length of the drive shaft.

Another object of my invention is to devise a hydraulic torque converter transmission wherein the input and output members are mounted in close relationship to each other and the structure of the converter overhangs a central open tunnel in which the vehicle wheel drive shaft can oscillate.

A still further object of my invention is to provide, in a torque converter transmission wherein forward and reverse speeds are obtained by arresting selectively two of its members against rotation and clutching them selectively to an output shaft, means for performing these functions by a combination of hydraulic and mechanical forces remotely controllable.

An important object is to devise, in a hydraulic torque converter transmission wherein forward and reverse speeds are obtained by braking means on the side of two of its members, means for clutching either one of these members to an output shaft and locating this clutching means adjacent the converter within the axial extent of the braking means so as to shorten the overall length to a minimum.

A still further object of my invention is to devise a hydraulic torque converter transmission in which all the rotating parts are held together as a unit and are rotatably supported by the driving shaft independently of the converter housing, whereby the length of the converter is reduced because of elimination of the usual end bearing supports as well as intervening supports between the several rotating members.

Another novel provision of my invention concerns the use of fluid seals functioning against radial rotating faces that are turned in the same axial direction whereby expansion of the converter housing will not effect the contact of one in favor of another one.

These and other useful objects of my invention will become apparent from the following description which presents first an outline of the general configuration and function of my new torque converter transmission, and then discloses the details of its structure with reference to the drawings accompanying this specification.

The torque converter transmission forming the subject matter of my invention is most suitable for vehicles wherein the engine is located between either the front or the rear wheels, and the drive is directly between both ends of the engine and the wheels. In such a case the distance between the engine and the wheel is generally too restricted to allow of the use of any of the existing transmissions because they are all too long and, consequently, the drive shaft and its universal joint could not accommodate the up-and-down movements of the wheel.

In order to make such a drive feasible, use is made, according to my present invention, of the well-known hydrokinetic torque converter which affords forward and reverse rotation of the output shaft by selective control without any gears, and means are provided for hydraulically changing from forward into reverse and vice versa by remote control; moreover, the output shaft is made in the form of a tubular member which provides room for the wheel drive shaft universal joint to be placed in close proximity of the engine crankshaft, and allows for even extreme oscillations of the drive shaft inside the converter assembly.

Through this configuration the wheel drive shaft is considerably lengthened and its angular deviations due to the wheel movements are so reduced as to make the use of direct drive between engine ends and the wheels practicable.

Figure 2:
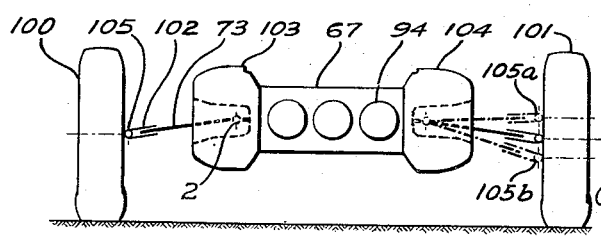
Figure 3:
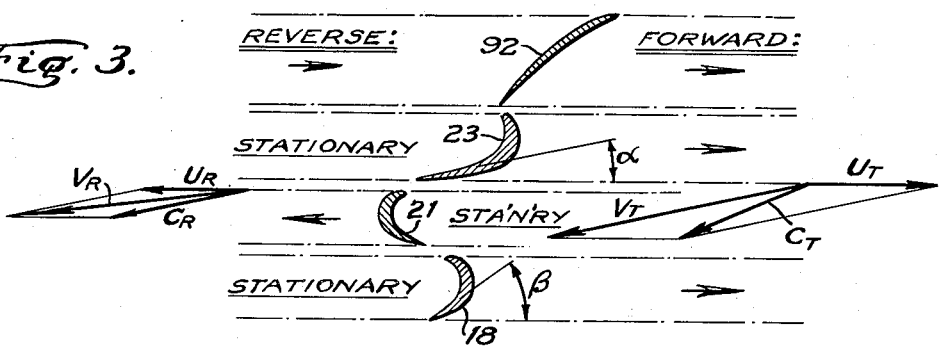
Figure 4:
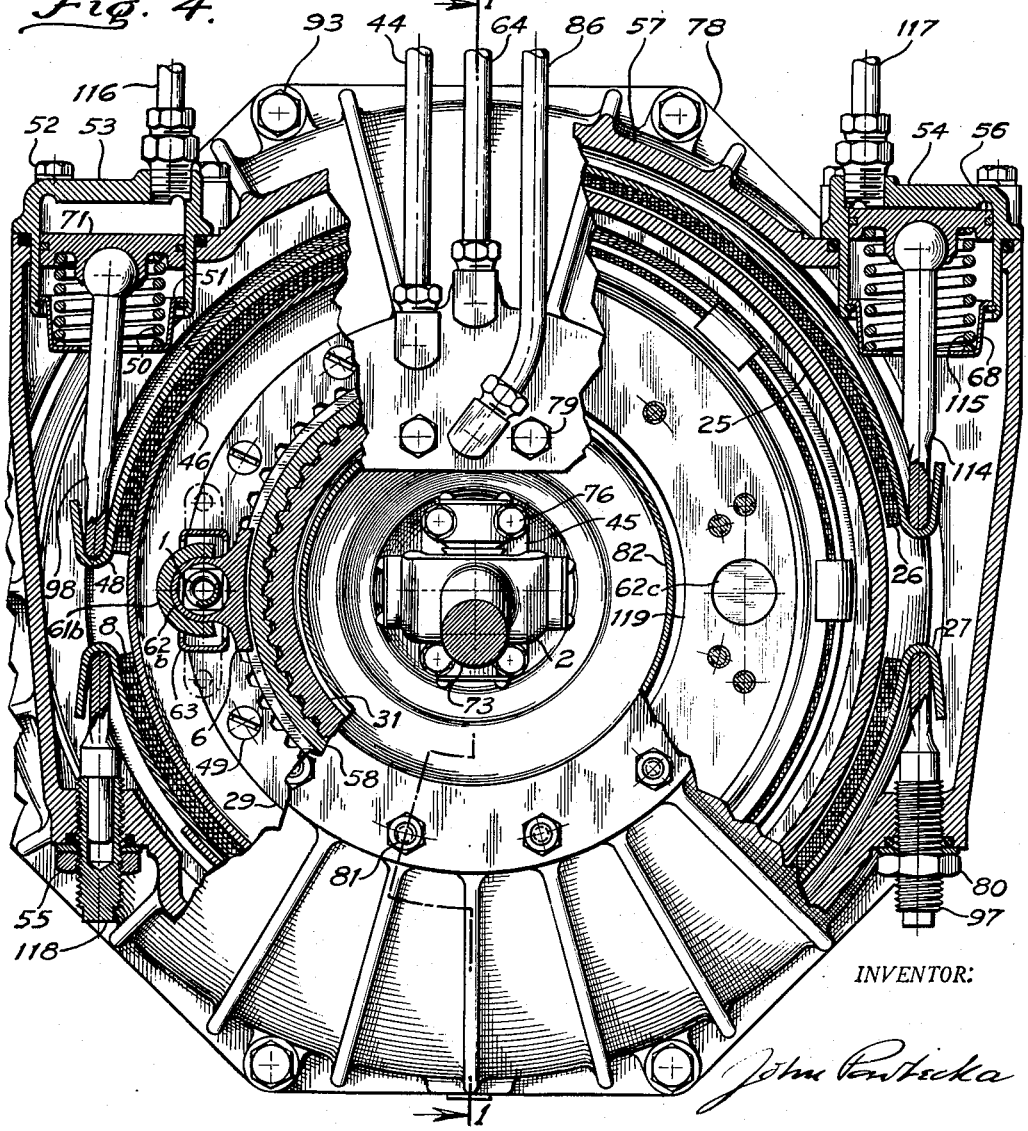

Having thus outlined the scope of my invention, I will now describe the same with reference to the drawings, in which Fig. 1 represents a longitudinal cross-section through the torque converter transmission taken in a vertical plane indicated by 1—1 in Fig. 4;

Fig. 2 is a diagrammatic view showing the installation of two torque converter transmissions on an engine between two vehicle wheels;

Fig. 3 is a view showing the blades of the converter elements in plane development of the circular line 3—3 in Fig. 1, and illustrates certain characteristics of the blade form and function; and Fig. 4 is a view of the outboard end of the transmission including two fragmentary cross-sections through its interior, the one on the right side being taken through the turbine brake drum, and the one on the left through the reactor drum in offset planes indicated by line 4—4 in Fig. 1.

Identical numerals in all the views denote the same parts.

Referring first to Fig. 2, the installation shown therein demonstrates the advantages of my new torque converter transmission two of which, 103 and 104, are mounted on the ends of an engine 67 located transversely between vehicle wheels 100 and 101; the converter configuration makes it possible to place the universal joint 2 deep into its body whereby the wheel drive shaft 73 is lengthened and its up-and-down deviations so reduced that they can be accommodated within the converter.

The torque converter, Fig. 1, is mounted on the engine 67 by means of a bell housing 95. The engine includes a crankshaft 72 the end of which is supported in a bearing 40; the crankshaft has at least one crankpin with a connecting rod 107 journalled to it, the connecting rod being actuated from a cylinder 94 which is shown, for purposes of illustration, 90 degrees out of place from its position in Fig. 2.

Secured to the ends of the crankshaft 72 by screws 106 and dowel pins 113 is a driving hub 20 which is characterized by a central hole with a bushing 43 in it, and by a radial face 9 on the side away from the crankshaft. The hub 20 is shown as being integral, in this particular embodiment, with a flywheel 11, and as mounting an accessory drive gear 10; in other engines with different crankshaft support the hub 20 may be made in one with the crankshaft 72, or it may be made integral with shaft 91 which is the torque converter input shaft proper; for these reasons the shaft 91 including a radial flange 13 together with the hub 20, or their mechanical equivalent, are hereinfurther jointly referred to, for purposes of definition, as the "input member."

The shaft 91 is secured to the hub 20 by means of screws 112 and has a relatively short cylindrical portion abutting the face 9, and spaced from it the flange 13 by means of which it supports and drives an impeller shell 15 with blades 92 on it. The shell 15 is joined to the flange 13 by screws 14, and a ball bearing 16 is clamped by them between the shell and the flange.

The bearing 16 mounts a hub 17 which is tubular and is formed with blades 18 around its mid-section; these blades constitute the secondary turbine stage, and around their periphery carry a ring 22; integral with this ring for an arc of about 90 degrees are blades 23, enclosed by a lateral shell 24, which represent the first or primary turbine stage.

Located at the extreme end of the turbine hub 17 is a bearing 19 which supports a shell 28 the inner face of which has reactor blades 21 on it.

The impeller blades 92, the primary turbine blades 23, the reactor blades 21, and the secondary turbine blades 18, with the respective shells 15, 24, 28, and the hub 17, jointly constitute the converter fluid circuit which, in transverse cross-section, has the shape of an annulus with a central vortex space; as a three dimensional body it represents a torus. A configuration of the profile of the shell blades for optimum performance in both forward and reverse drive is shown in Fig. 3, and is characterized by the feature in that the exit angle $\alpha$ of the primary turbine blades 23 is preferably smaller than the corresponding angle $\beta$ of the secondary turbine blades 18 in order to utilize the momentum of the fluid mainly for propelling the primary turbine which, by virtue of its larger radius of revolution, thus can generate the greatest turning moment obtainable; moreover, by reducing the angle $\alpha$ to a practical minimum, not only will the reactive component of the absolute exit velocity $C_T$ in driving forward be the greatest obtainable, but in reverse drive the impulse component of the absolute inflow velocity $C_R$ directed upon the reactor blades will also be the greatest that can be developed.

The tubular turbine hub 17 contains two end bearings 32 and 33, the latter being held in place through the medium of an auxiliary sleeve 31 which is threaded into the hub 17 to hold the reactor bearing 19 on it; the sleeve 31 has a row of teeth or splines 34 located peripherally apart from the bearing 19.

The bearings 32 and 33 support a tubular output shaft 35 which is held in place against side thrust by a lock ring 110, and which consists of a cylindrical middle portion and conical end portions 36 and 37, respectively. The conical portion 37 has splines 38 on its extremity next to the splines 34 on the turbine hub sleeve 31. The inwardly tapering shaft portion 36 becomes a radial web at and around a central boss 39 which is journalled in the bushing 43 of the driving hub 20, and has a splined hole through it.

The drive between the output shaft 35 and a vehicle wheel is through the boss 39 and a splined shaft 41 which is retained in it by a lock ring 69 against being pulled out, and which carries, next to the radial web 98, a washer 42 and a universal joint flanged hub 45, both held on it by a screw 70.

The output shaft 35 and the shaft 41 splined into it jointly represent the interior means for delivering the converter power to the outside and they, or their mechanical equivalent, are hereinafter referred to as the "output member."

Attached to the flange of the hub 45 demountably by screws 76 is a universal joint 2 connected to a wheel drive shaft 73 which projects outwardly through the output shaft 35, and connects to a vehicle wheel universal joint 105 through a slip joint 102.

The output shaft 35 and the oscillating shaft 73 are driven by the turbine hub 17 when going forward, and by the reactor shell 28 when backing up. To this end, selective clutching means remotely operable is provided; furthermore, the member, either the turbine or the reactor, that is not driving must be restrained from motion. To perform this function, the primary turbine shell 24 is formed with a brake drum 25, the drum having on it a brake band 27 lined with frictional material 26. Similarly, the reactor shell 28 is provided with a brake drum 46 which extends axially away from it and has a brake band 48 with lining 8 around it. The brake drum 46 is clamped onto the reactor shell 28 by a ring 29 and screws 49, the ring 29 also retaining the bearing 19 in the shell, and having internal teeth or splines 30 on its inner diameter.

For applying the brake bands 48 and 27 and thereby arresting either the reactor or the turbine against rotation, hydraulic cylinders 53 and 54 (Fig. 4), respectively, are mounted over them; the cylinders have pistons 71 and 56 in them, the pistons being held normally in retracted position by springs 50 and 115, respectively. The springs are contained in cups 51 and 68 which are held in the cylinders by lock rings. The pistons 71 and 56 apply the brake bands 48 and 27 to their brake drums 46 and 25, respectively, by means of push rods 98 and 114; the brake bands are adjustably anchored in a casing 57 by threaded studs 118 and 97 and check nuts 55 and 80, respectively.

Hydraulic pressure is imposed upon or released from the pistons 71 and 56 by remote control means through leads 116 and 117 which are tapped into the respective cylinders. As soon as hydraulic pressure in either cylinder is relieved, the piston therein is pushed back into the cylinder by its return spring thereby allowing the associated brake band to relax, due to its springiness, its hold on the brake drum.

For clutching the turbine or the reactor to the output shaft 35, the external splines 34 on the turbine hub, on the internal splines 30 on the reactor ring 29, respectively, are coupled to the splines 38 on the output shaft. For this purpose a clutch collar 58 is provided; it has internal splines 60 complemental to the output shaft splines 38 and in permanent sliding engagement with them. For engaging the turbine splines 34, the clutch collar 58 has a row of complemental internal splines 109 inside its inboard end, and a row of external splines 59 around the same end for meshing with the splines 30; it also has a peripheral groove 7 for shifting it.

To perform this shifting, a set of hydraulic cylinders 61 is provided, in this case four in number, equally spaced around the collar 58; only cylinder 61a is visible in Fig. 1, and cylinder 61b in Fig. 4. The cylinders are bored through bosses in a round plate 119 which is mounted on the inside of a radial end wall 66 of the casing 57 so that this wall forms the rear closure for the cylinders; behind the plate 119 is cut a groove 65 in the wall 66 for distribution of hydraulic fluid to all four cylinders 61, the fluid being delivered into this groove from remote control means by an external lead 64 tapped into the wall 66.

The cylinders 61 each contain a piston 62 which is equipped with a segmental shoe 6 fitted into the groove 7 on the collar 58, and the pistons are normally held in retracted position against the wall 66 by springs 1 which are nested between the pistons and brackets 63, the latter being secured to the plate 119 across each cylinder.

In their retracted position the pistons 62 hold the clutch collar 58 so that its splines 109 mesh with the turbine splines 34, thereby causing the output shaft 35 to be driven for forward travel; at the same time, the reactor brake drum 46 is being held stationary by the brake band 8, the cylinder 53 and the piston 71 therein. For shifting into reverse, hydraulic fluid under pressure is introduced between the wall 66 and the pistons 62 in the cylinders 61 thereby overpowering the springs 1 and disengaging the splines 109 from the splines 34, and thereupon meshing the splines 59 with the reactor splines 30. Simultaneously, the reactor brake drum 46 is released for rotation by withdrawing pressure from the cylinder 53 and applying it to the cylinder 54, which causes the turbine brake drum 25 to be stopped and held against rotation.

As long as hydraulic pressure is maintained in the cylinders 61, the reactor shell 28 will drive the output shaft 35 in reverse. As soon as the pressure is withdrawn, the springs 1 will return the pistons 62 into the cylinders 61 and the clutch collar 58 into its normal or "forward" position, and will hold it there; at the same time, the turbine brake drum 25 is released and the reactor drum 46 arrested against rotation by their mechanical and hydraulic operating mechanisms.

The structure so far disclosed represents all the rotating and moving parts of the converter, all of which are enclosed in a common housing or container which holds the operating fluid. This housing comprises an end wall 74 originating around the input shaft 91 and following the impeller to its periphery where it forms a pilot shoulder 75, and from it projects radially with a peripheral flange 108. Abutting this flange is a mating flange 78 of the casing 57 which rides on the pilot 75 and has an elastic seal ring 77 lodged in a groove around it. The casing 57 is secured to the rigid bell housing 95 by means of screws 93 with the flange 108 of the wall 74 included between them.

The casing 57 is preferably a casting with reinforcing and cooling ribs on it, and with two flanged openings over the brake bands 27 and 48, one on each side of the converter, for mounting the brake cylinders 53 and 54 by means of screws 52. On the bottom side of the casing 57 are threaded bosses for the brake anchor studs 118 and 97. At its end, the casing 57 forms the aforementioned radial wall 66 in which a recess is bored out to receive the pilot the shifter cylinder plate 119 held in place by studs 81.

The interior part of the converter housing is provided by a central tubular member 82 which has a radial flange 96 at its outer end piloted and clamped in a recess in the wall 66 behind the shifter cylinder plate 119. An elastic seal ring 83 is lodged in a groove in the wall 66 to bear against the flange 96.

The casing 57 embodies a novel feature in that it abuts the two flanges 108 and 96 of the associated parts and presses the seal rings 77 and 83 into contact with them from the same axial direction, the significance of which is that the casing can be readily and easily assembled on or taken off the converter for inspection or replacement of the seal rings, and when removed, exposes the whole converter without disturbing its mounting.

The interior tubular member 82 projects from its flange 96 inwardly through the output shaft 35 past the universal joint 2 therein toward the radial web 98 and thereat terminates with a cylindrical boss around the universal joint hub 45.

In the upper side of the tubular member 82 near its end is a pierced hole through which a tube 84 is inserted and brazed therein for discharge of air and fluid from the converter; this tube is within the smallest diameter of the converter fluid circuit so that it will remove all air from it which is displaced to the center when the converter runs. The tube 84 has a flange 85 on it in co-planar alinement with the flange 96 on the tubular member 82, and with it abuts the wall 66 and is secured to it by screws 79 (Fig. 4). A tapped hole in the wall 66 takes the air and fluid from the tube 84 into an outside return lead 86.

The supply of fluid into the converter is through a lead 44 which delivers it through the wall 66 and the plate 119 thereon.

There are only two rotating parts entering the converter housing, i. e., the input shaft 91 and the output shaft 35, and fluid seals are provided for them in the housing. In as much as the walls of the housing are subject to warpage and expansion due to heat and internal pressure, and the shafts are subject to misalinement since they run in sleeve bearings, I have provided seals that have no contact with the rotating shafts themselves but function against radial rotating faces adjacent the shafts; moreover, as a novel feature, these radial faces are turned in the same direction whereby axial expansion of the housing will not cause unequal pressure on the sealing contact.

For this purpose, the housing wall 74 is formed with a cylindrical boss 12 around the input shaft 91, and the radial face 9 on the associated hub 20 is extended beyond the diameter of the shaft 91; attached to the wall 74 is a retainer 89 which has a radial attaching flange and a cylindrical extension with a small clearance around the shaft 91. Inserted in the boss 12 slidably is a ring 87, made of carbon and graphite, which is restrained from rotation by a spur 99 on the retainer 89. The ring 87 is pressed into contact with the face 9 by a number of springs 90 placed in the back of it in the retainer 89, and also by hydraulic pressure of the converter fluid. The seal between the stationary wall 74 and the ring 87 is by an elastic band 88 lodged in a groove in this ring.

The seal between the tubular housing member 82 and the output shaft 35 is at the input end of the converter in a nearly co-planar relationship to the first seal, both seals jointly forming an annular space between them through which the driving as well as the driven shafts enter the converter housing. The tubular member 82 ends with a cylindrical boss and supports a retainer around the universal joint hub 45 in a manner identical with that of the aforementioned first seal. All the other parts are likewise analogous to the ring 87, springs 90, and the elastic band 88, previously disclosed, the seal ring in this case contacting the washer 42 backed up by the web 98 of the output shaft 35.

One of the novel results of the configuration of my new converter resides in that it forms a single unit inside a housing, which unit can be assembled as such and then secured to the engine crankshaft. This is made possible by the aforementioned provision for supporting all the rotating parts of the converter from the engine crankshaft to the exclusion of any bearings in the converted housing, and by the provision for making the converter casing 57 abut both its complemental members from the same axial direction.

The manner in which the above features facilitate the assembly as well as the dis-assembly of the converter can be demonstrated by following the latter procedure: After disconnecting all the outside hydraulic leads, the wheel drive shaft 73 and the universal joint 2 are detached from the hub 45 by removing the screws 76 whereupon the hub itself is pulled off the shaft 41 by removing the screw 70; now the whole converter housing including the shifter cylinders 61, the clutch collar 58, and the central tubular member 82, can be removed by taking off the screws 93. Upon removing the washer 42, the mounting screws 106 are made accessible through a hole 5 in the output shaft 35, and after their withdrawal the whole converter including the driving hub 20 and the flywheel 11, if one is used, comes off as a unit.

I claim:

1. In a hydraulic torque converter transmission, an input member having one end driven by a power source, an impeller secured to the other end thereof, one bearing at each of said input member ends, an output member, a reactor, and a turbine having a tubular hub, two spaced bearings in said hub and a third bearing on one end thereof remote from said impeller, said turbine hub being supported rotatably in said input member impeller bearing, said reactor being carried rotatably on said turbine hub third bearing, and said output member being journalled rotatably in said input member driven end bearing and in said two spaced turbine hub bearings.

2. In a hydraulic torque converter transmission, an input member, a number of bladed shells jointly constituting the converter fluid circuit, an output member having a tubular body open at one end and rotatably journalled centrally in said shells, a stationary fluid container enveloping said shells and projecting into said output member, and fluid seals between said container and said input and output members, said latter seal being located inside said output member in close axial relationship to said former seal whereby said input and output members enter said container through an annular clearance between said seals.

3. In a hydraulic torque converter transmission, an input member having a rotating radial face, a central hollow output member having a rotating radial face in the interior thereof turned in the same axial direction as said input member face, a stationary fluid container enveloping the transmission between said input member and said output member and projecting into the interior of said output member, and fluid seals supported by said container non-rotatably and movably both in the same axial direction against said two radial faces.

4. In a hydraulic torque converter transmission, an input member having a rotating radial face, a central hollow output member having a rotating radial face in the interior thereof, a stationary fluid container enveloping the converter between said input member and said output member and projecting into the interior of said output member, said container forming a cylindrical boss at each of said radial faces, a sealing ring slidably supported by each of said bosses, means for restraining said rings from rotation, means for urging said rings into contact with said radial faces, and an elastic band lodged circumferentially between each sealing ring and said supporting boss thereof.

5. In a hydraulic torque converter transmission, an input member, an output member, an impeller secured to said input member, a reactor, a two-stage turbine jointly with said impeller and reactor forming a torus, the first turbine stage occupying an outer lateral sector and the second stage an inner central sector of said torus, said sectors being interconnected between said impeller and said reactor, said impeller occupying the wider and said reactor the narrower remaining sectors of said torus, bearing means on opposite sides of said second turbine stage, one of said bearing means supporting said turbine rotatably from said input member and the other one supporting said reactor rotatably on said turbine, bearing means in said input member and in said turbine for supporting said output member rotatably, means on said first turbine stage and on said reactor for arresting them selectively against rotation, said arresting means being located at the axial end of said torus remote from said impeller, and means connected to said second turbine stage and to said reactor within and adjacent to said arresting means for clutching them selectively to said output member.

6. In a hydraulic torque converter transmission, a number of bladed shells jointly constituting the converter fluid circuit, an input member at one axial end of said circuit driving the first one of said shells, a universal joint and an associated oscillatable shaft, said universal joint being positioned at the same axial end of said fluid circuit as said input member and being driven by another one of said shells and having said shaft projecting therefrom through the opposite axial end of said fluid circuit, means for supporting said first shell on said input member around said universal joint and shaft, and means for supporting said others of said shells rotatably from said input member around said universal joint and shaft.

7. In a hydraulic torque converter transmission, a number of bladed shells jointly constituting the converter fluid circuit, an input member at one axial end of said circuit driving the first one of said shells, an output member driven by one of the others of said shells and having one extremity at said input member and therefrom extending with a tubular body centrally through said fluid circuit to an open extremity at the opposite axial end, a driven shaft oscillatably secured inside said output member and projecting outwardly through said open extremity thereof, means for mounting said first shell on said input member around said output member, means for supporting one other of said shells rotatably from said input member and from said first shell around said output member, means for mounting the remaining of said other shells rotatably on said one other shell around said output member, and means for supporting said output member rotatably in said one other shell.

8. In a hydraulic torque converter transmission, an input member at one end of the transmission, an impeller mounted on and driven by said member, a turbine having an elongated hub, a reactor jointly with said impeller and turbine forming the converter fluid circuit, an output member having one extremity at said input member and therefrom extending through said fluid circuit to the opposite end of the transmission and being driven thereat selectively by said turbine and reactor, two bearing means carried by said input member, said output member being rotatably supported by one of said bearing means and said turbine hub by the other one, bearing means on said turbine hub for rotatably supporting said reactor, and bearing means in said turbine hub for supporting said output member rotatably whereby said impeller, turbine, reactor, and output member form a unitary assembly supported by said input member.

9. In a hydraulic torque converter tanrsmission, a number of bladed shells jointly constituting the converter fluid circuit, an input member at one axial end of said fluid circuit driving one of said shells, an output member having an inner extremity at said input member and therefrom extending with a tubular body centrally through said fluid circuit to an open extremity at the opposite end, a shaft oscillatably secured to said inner extremity of said output member and projecting outwardly through said open extremity thereof, and a fluid container enclosing said shells between said input member and said open extremity of said output member and having a tubular portion protruding from said open extremity inwardly into said output member around said oscillatably secured shaft therein.

10. In a hydraulic torque converter transmission, an input member at one end of the transmission, an impeller mounted on and driven by said member, a turbine and a reactor jointly with said impeller forming the converter fluid circuit, an output member having an inner extremity at said input member and therefrom extending with a tubular body centrally through said fluid circuit to an open extremity at the other end of the transmission, a shaft oscillatably secured to said inner extremity of said output member and projecting outwardly through said open extremity thereof, means comprising rotating and non-rotating parts for selectively arresting said turbine and reactor against rotation, means comprising rotating and non-rotating parts for selectively coupling said turbine and reactor to said output member open extremity, means for supporting said turbine, reactor, output member, and said rotating parts of the arresting and coupling means rotatably from said input member as a unitary assembly; a fluid container enveloping the transmission between said input member and said output member open extremity and having a tubular portion protruding from said open extremity around said oscillatably secured shaft into said output member to said inner extremity thereof, said container supporting said non-rotating parts of said arresting and coupling means, and fluid seals between said container and said input member and between said tubular portion of said container and said output member.

11. In a hydraulic torque converter transmission, a number of bladed shells jointly constituting the converter fluid circuit, an input member at one axial end of said fluid circuit driving one of said shells, an output member having an inner extremity at said input member and therefrom extending with a tubular body centrally through said fluid circuit to an open extremity at the opposite end and being driven thereat by certain of said shells, a universal joint secured to said inner extremity of said output member, an oscillatable shaft projecting from said universal joint outwardly through said output member open extremity; a stationary housing containing fluid and comprising, a wall at and around said input member, a casing enclosing said fluid circuit between said wall and said output member open extremity and having a radial inner face thereat, and a central tubular member abutting said radial face and therefrom protruding around said oscillatably secured shaft into said output member beyond said universal joint therein, and fluid seals supported by said wall around said input member and by said central tubular member inside said output member.

12. In a transmission substantially as set forth in claim 11, said wall around said input member having a peripheral radial flange, said central tubular member having a radial flange adjacent said output member open extremity, said casing having complemental radial flanges abutting said wall and tubular member flanges from the same axial direction and being secured thereto.

13. In a transmission substantially as set forth in claim 11, means for feeding fluid into said housing, external fluid discharge means connecting to and extending through said casing to said inner face thereof, said central tubular member having a fluid passage running between the interior surface thereof and said casing face in registry with said fluid discharge means therein and having a flange around said passage abutting said face and being secured thereto.

14. In a hydraulic torque converter transmission, a number of bladed shells jointly constituting the converter fluid circuit, an input member at one axial end of said fluid circuit driving the first one of said shells, an output member having an inner extremity at said input member and therefrom projecting with a tubular body centrally through said fluid circuit to an open extremity at the opposite axial end; means for coupling said output member selectively to the others of said number of shells, a shaft secured oscillatably to said inner extremity of said output member and projecting outwardly through said open extremity thereof; a housing enclosing the transmission and extending from said input member to said output member open extremity and forming a radial wall thereat, an annular member for mounting said coupling means secured to said radial wall around said output member open extremity; and a central tubular housing member extending through said output member around said oscillatably secured shaft therein and having a flange abutting said radial wall, said tubular housing member being supported by having said flange thereof clamped between said radial wall and said annular member.

15. In a hydraulic torque converter transmission, a number of bladed shells jointly constituting the converter fluid circuit, an input member at one end of the transmission mounting and driving the first one of said shells; an output member projecting from said input member centrally through said fluid circuit to the other end of the transmission, means for rotatably supporting the others of said shells from said input member around said output member, means for rotatably supporting said output member by said input member and one of said shells; means for selectively driving said output member by said others of said shells including coupling means between said output member and said shells located at said other end of the transmission; a stationary fluid container enveloping the transmission and having an inner radial face adjacent said coupling means, means for actuating said coupling means comprising an annular plate having a plurality of open ended cylinders therein and being mounted on said container inner face; pistons in said cylinders connected to said coupling means; means for holding said pistons against said inner face in one coupling position; and means for feeding fluid under pressure inbetween said inner face and said pistons for displacing said pistons into their other coupling position.

16. In a hydraulic torque converter transmission, an input member at one end of the transmission, an impeller driven by said member, a turbine and a reactor jointly with said impeller forming the converter fluid circuit, an output member having an inner extremity at said input member and therefrom extending with a tubular body centrally through said fluid circuit to an open extremity at the opposite end and having a splined periphery around said open extremity, a shaft oscillatably secured to said inner extremity of said output member and projecting outwardly through said open extremity thereof, means for selectively arresting said turbine and reactor against rotation, said turbine and reactor each having a row of splines in juxtaposition to said output member splined periphery; a collar engaging said periphery slidably in and out of mesh with said turbine and reactor rows of splines, at least one cylinder and a piston therein, said piston having means for engaging said collar, means for holding said piston normally in said cylinder for coupling said turbine to said output member through said collar; means for displacing said piston from said normal position hydraulically for coupling said reactor to said output member, a stationary housing enclosing the transmission and containing fluid therefor, said housing having a wall adjacent said output member open extremity and supporting said cylinder thereat and having a central tubular member protruding from said wall into said output member around said shaft therein, and fluid seals between said housing and said input member and between said housing central member and said output member.

17. In a hydraulic torque converter transmission, a number of bladed shells jointly constituting the converter fluid circuit, an input member at one end of the transmission driving one of said shells, an output member driven by at least one other of said shells, said output member having an internally splined boss rotatably journalled in said input member and therefrom extending with a tubular body centrally through said fluid circuit to an open extremity at the other transmission end; a universal joint positioned inside said output member and having an internally splined boss in axial alinement with said output member boss and having an oscillatable shaft projecting therefrom outwardly through said output member open extremity, a splined shaft inserted in said output member boss and projecting into and mounting said universal joint boss; means for retaining said shaft in said output member, and means for retaining said universal joint and shaft on said splined shaft.

JOHN PAVLECKA.

REFERENCES CITED

The following references are of record in the file of this patent:

UNITED STATES PATENTS

| Number | Name | Date |
|---|---|---|
| 1,960,705 | Köchling | May 29, 1934 |
| 2,152,113 | Van Lammeren | Mar. 28, 1939 |
| 2,235,673 | Dodge | Mar. 18, 1941 |
| 2,391,682 | Mayner | Aug. 7, 1945 |
| 2,401,376 | Sherman | June 4, 1946 |

FOREIGN PATENTS

| Number | Country | Date |
|---|---|---|
| 376,268 | Great Britain | July 4, 1932 |
| 15,527 | France | May 14, 1912 |
| (Addition to 438,693) | | |